(12) United States Patent
Yang

(10) Patent No.: US 10,043,540 B1
(45) Date of Patent: *Aug. 7, 2018

(54) HEALTH MONITORING FOR HEAD OF A HEAT-MAGNETIC RECORDING DEVICE USING A WRITER-READER OFFSET

(71) Applicant: Seagate Technology LLC, Cupertino, CA (US)

(72) Inventor: Won Choul Yang, Kowloon (HK)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/667,245

(22) Filed: Aug. 2, 2017

Related U.S. Application Data

(63) Continuation of application No. 15/244,564, filed on Aug. 23, 2016, now Pat. No. 9,741,378.

(51) Int. Cl.
| | |
|---|---|
| *G11B 11/00* | (2006.01) |
| *G11B 5/455* | (2006.01) |
| *G11B 5/58* | (2006.01) |
| *G11B 20/18* | (2006.01) |
| *G11B 5/00* | (2006.01) |
| *G11B 7/1263* | (2012.01) |
| *G11B 7/1267* | (2012.01) |
| *G11B 5/60* | (2006.01) |
| *G11B 7/126* | (2012.01) |

(52) U.S. Cl.
CPC ............ *G11B 5/455* (2013.01); *G11B 5/58* (2013.01); *G11B 20/182* (2013.01); *G11B 5/6088* (2013.01); *G11B 7/126* (2013.01); *G11B 7/1263* (2013.01); *G11B 7/1267* (2013.01); *G11B 2005/0021* (2013.01)

(58) Field of Classification Search
None
See application file for complete search history.

(56) References Cited

U.S. PATENT DOCUMENTS

| | | |
|---|---|---|
| 7,633,694 B2 | 12/2009 | Alex et al. |
| 8,922,929 B1 | 12/2014 | Ruan et al. |
| 8,929,186 B1 | 1/2015 | Sharma et al. |
| 9,093,091 B1 * | 7/2015 | Chu .................. G11B 5/314 |
| 9,123,370 B1 | 9/2015 | Ruan et al. |
| 9,135,937 B1 | 9/2015 | Goulakov |
| 9,311,951 B1 | 4/2016 | Chu et al. |

(Continued)

*Primary Examiner* — Tan X Dinh
(74) *Attorney, Agent, or Firm* — Hollingsworth Davis, LLC

(57) ABSTRACT

A method includes moving a heat-assisted magnetic recording head relative to a magnetic recording medium comprising a plurality of tracks, the head comprising a reader and a writer including a near-field transducer (NFT) optically coupled to a laser diode, the writer comprising a center which is laterally offset relative to a center of the reader to define a writer-reader offset (WRO) therebetween. Patterns are written to a particular track at a plurality of laser diode current levels. The patterns are read and a WRO value is calculated at a peak amplitude position for each of the laser diode current levels. A slope of the WRO values is determined with the laser current diode levels. A health condition of the NFT is determined by determining if the slope is greater than a predetermined threshold indicative of non-uniform activation across the NFT.

20 Claims, 7 Drawing Sheets

(56) References Cited

U.S. PATENT DOCUMENTS

| | | |
|---|---|---|
| 9,472,223 B1 * | 10/2016 | Mendonsa ......... G11B 5/59638 |
| | | 369/13.33 |
| 9,536,550 B1 | 1/2017 | Ma et al. |
| 9,564,157 B1 | 2/2017 | Trantham et al. |
| 9,607,649 B1 | 3/2017 | Riddering et al. |
| 9,741,378 B1 * | 8/2017 | Yang ..................... G11B 5/488 |
| | | 369/13.33 |
| 2008/0239906 A1 * | 10/2008 | Akagi ................ G11B 5/59633 |
| | | 369/53.17 |
| 2015/0187378 A1 | 7/2015 | Peng et al. |
| 2016/0055881 A1 | 2/2016 | Cordle et al. |
| 2016/0104514 A1 | 4/2016 | Burnett et al. |
| 2016/0343395 A1 | 11/2016 | Rausch et al. |
| 2017/0018284 A1 | 1/2017 | Lou et al. |

* cited by examiner

US 10,043,540 B1

HEALTH MONITORING FOR HEAD OF A HEAT-MAGNETIC RECORDING DEVICE USING A WRITER-READER OFFSET

RELATED PATENT DOCUMENTS

This application is a continuation of U.S. Ser. No. 15/244,564, filed on Aug. 23, 2016, to which priority is claimed and which is incorporated herein by reference in its entirety.

SUMMARY

Embodiments are directed to a method comprising moving a heat-assisted magnetic recording head relative to a magnetic recording medium comprising a plurality of tracks, the head comprising a reader and a writer including a near-field transducer (NFT) optically coupled to a laser diode, the writer comprising a center which is laterally offset relative to a center of the reader to define a writer-reader offset (WRO) therebetween. Patterns are written to a particular track at a plurality of laser diode current levels. The patterns are read and a WRO value is calculated at a peak amplitude position for each of the laser diode current levels. A slope of the WRO values is determined with the laser current diode levels. A health condition of the NFT is determined by determining if the slope is greater than a predetermined threshold indicative of non-uniform activation across the NFT.

A method comprises moving a heat-assisted magnetic recording head relative to a magnetic recording medium comprising a plurality of tracks, the head comprising a reader and a writer including a near-field transducer (NFT) optically coupled to a laser diode, the writer comprising a center which is laterally offset relative to a center of the reader to define a writer-reader offset (WRO) therebetween. Patterns are written to a particular track at a plurality of laser diode current levels. The patterns are read and a WRO value is calculated at a peak amplitude position for each of the laser diode current levels. A health condition of the NFT is determined by determining if a difference of WRO values at the peak amplitude between at least two laser current values is greater than a threshold.

Embodiments are directed to an apparatus comprising a preamplifier section configured to communicate with a read transducer and write transducer of a heat-assisted magnetic recording head that reads from and writes to a recording medium comprising a plurality of tracks. The heat-assisted magnetic recording head comprises a near-field transducer (NFT) optically coupled to a laser diode. A controller is coupled to the preamplifier section and configured to move the heat-assisted magnetic recording head relative to the magnetic recording medium, the head comprising a reader and a writer, the writer comprising a center which is laterally offset relative to a center of the reader to define a writer-reader offset (WRO) therebetween. The controller is configured to write patterns to a particular track at a plurality of laser diode current levels. The controller is configured to read the patterns and calculate a WRO value at a peak amplitude position for each of the laser diode current levels. The controller is configured to calculate a slope of the WRO values with the laser diode current levels. The controller is configured to determine a health condition of the NFT by determining if the slope is greater than a predetermined threshold indicative of non-uniform activation across the NFT.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
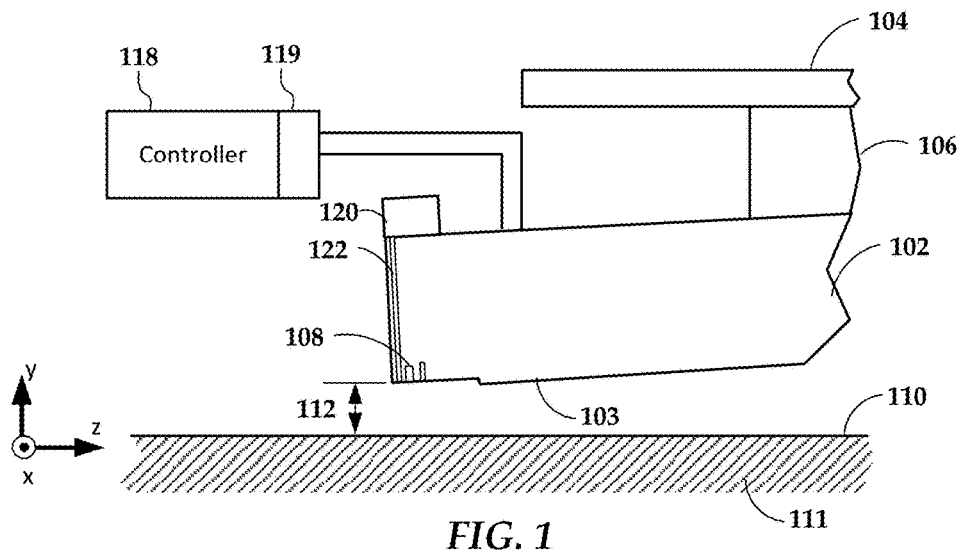
FIG. 1 is a block diagram of a hard drive slider and media arrangement according to an example embodiment.

The present disclosure generally relates to data storage devices such as conventional magnetic recording (CMR) and those utilizing heat-assisted magnetic recording (HAMR), also referred to as energy-assisted magnetic recording (EAMR), thermally-assisted magnetic recording (TAMR), and thermally-assisted recording (TAR). The read transducer and reading process in CMR and HAMR are similar, e.g., utilizing a magnetoresistive sensor. The writing process in HAMR is different from that of CMR. A HAMR head uses an energy source such as a laser to create a small hotspot on a magnetic disk during recording. The heat lowers magnetic coercivity at the hotspot, allowing a write transducer to set the magnetic orientation of the grains in the hotspot, after which the hotspot is allowed to rapidly cool. Due to the relatively high coercivity of the medium after cooling, the data is less susceptible to data errors due to thermally-induced, random fluctuation of magnetic orientation known as the paramagnetic effect. This allows data to be reliably written to a smaller area on a HAMR medium than would be possible using a recording medium with lower coercivity.

In HAMR, a laser or other energy source may be directly (e.g., surface-attached) or indirectly (e.g., via optical fiber) coupled to a HAMR read/write head. An optical path (e.g., waveguide) may be integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head. The NFT may also be referred to as a plasmonic transducer, plasmonic antenna, near-field antenna, nano-disk, nano-patch, nano-rod, etc.

Generally, the NFT is formed by depositing thin-film of material such as gold, silver, copper, etc., a region near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium and generates heat.

Due to the intensity of the laser light and the small size of the NFT, the NFT and its surrounding material are subject to a significant rise in temperature during writing. Over time, this can affect integrity of the NFT, for example, causing it to become misshapen. Other events, such as contact between the read/write head and recording medium, contamination, etc., may also degrade the operation of the NFT and nearby optical components. The degradation of the NFT will affect the effective service life of a HAMR read/write head and thus that of the corresponding data storage device.

As the NFT degrades, the overall writing efficiency can change (e.g., less or more optical energy emitted for the same level of laser power), which can affect the written track width and the quality of the recording. This can affect bit error rate (BER), as well as change the location of the written track center relative to the track center defined by the servo system. This latter effect is sometimes referred to as reader-to-writer offset (RWO) change.

In reference now to FIG. 1, a block diagram shows a side view of a read/write head 102 according to an example embodiment. The read/write head 102 may be used in a magnetic data storage device, e.g., HAMR hard disk drive. The read/write head 102 may also be referred as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating. A heater (not shown) may be located near the media-facing surface 103 to actively adjust the flying height 112. Such a heater causes localized thermal expansion near the read/write transducers.

A controller 118 is coupled to the read/write transducers 108, as well as other components of the read/write head 102, such as heaters, sensors, etc. The controller 118 may be part of general- or special-purpose logic circuitry that controls the functions of a data storage device (e.g., hard disk drive, hybrid drive) that includes at least the read/write head 102 and recording medium 111. The controller 118 may include or be coupled to interface circuitry 119 such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hot spot on the recording medium 111 and are near the read/write transducer 108. These components include laser 120 (or other energy source) and waveguide 122. The waveguide 122 delivers light from the laser 120 to components near the read/write transducers 108. These components are shown in greater detail in FIG. 2, which is a block diagram illustrating a cross-sectional view of the read/write head 102 according to an example embodiment.

Figure 2:
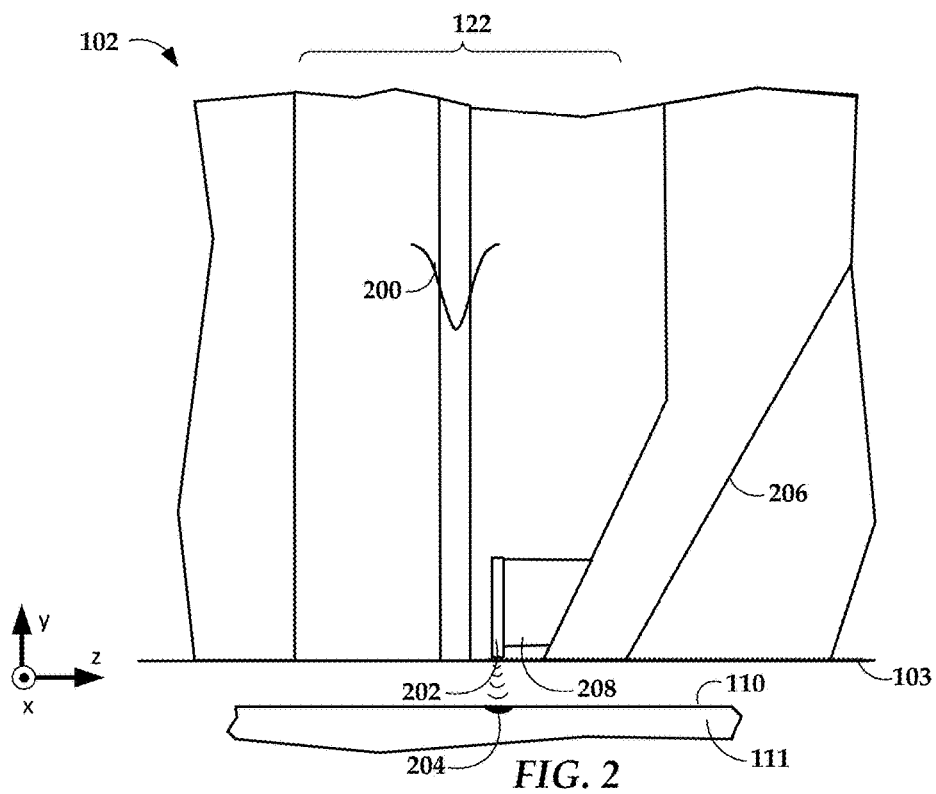
FIG. 2 is a cross-sectional view of a read/write head according to an example embodiment.

As shown in FIG. 2, the waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 (which is part of the read/write transducer 108 shown in FIG. 1) emits magnetic flux near the media-facing surface 103 in response to an applied current. Flux from the write pole 206 sets the magnetic orientation of the hotspot 204 as it moves under the write pole 206 in the downtrack direction (z-direction).

The energy 200 applied to the near-field transducer 202 creating the hotspot 204 can cause a significant temperature rise in a local region near the media-facing surface 103. The near-field transducer 202 may include a heat sink 208 that draws away some heat, e.g., to the write pole 206 or other nearby heat-conductive component. Nonetheless, the temperature increase near the near-field transducer 202 can be significant, leading to degradation of the near-field transducer 202 and other components over time.

As the NFT degrades, the overall writing efficiency changes (e.g. reduced or increased optical output for the same laser power input), which can affect the written track width. The changes in track width can result in changes in BER. Degradation of the NFT can also change the location of the written track center relative to the servo-defined center location, the aforementioned RWO change. Accordingly, methods and apparatuses described herein monitor the health of the NFT and identify when re-optimization is needed and/or when the host system should be notified.

Figure 3A:
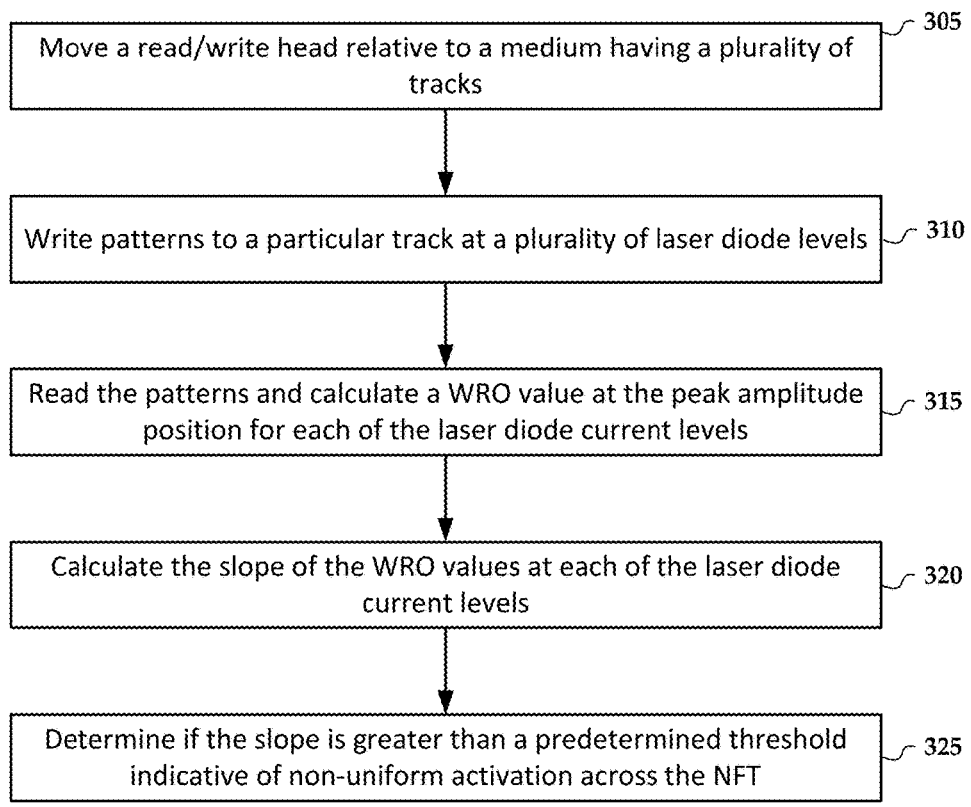
FIGS. 3A and 3B are flowcharts illustrating methods according to example embodiments.

FIG. 3A illustrates a process for monitoring the health of a head in accordance with embodiments described herein. A read/write head is moved 305 relative to a magnetic medium having a plurality of tracks. The read/write head comprises a reader and a writer including a near-field transducer (NFT) optically coupled to a laser diode. The writer comprises a center which is laterally offset relative to a center of the reader to define a writer-reader offset (WRO) therebetween. At least one test pattern is written 310 to a test track at a plurality of laser diode current levels. The test track may be a known good track that can be used to find the defects in elements of the head. The test patterns are read 315 and WRO values are calculated 320 at the peak amplitude position for each of the laser diode current levels. It is determined 325 whether a slope of the WRO values versus the laser diode current level is greater than a predetermined threshold indicative of non-uniform activation across the NFT. Non-uniform activation may indicate a defect in the NFT.

Figure 3B:
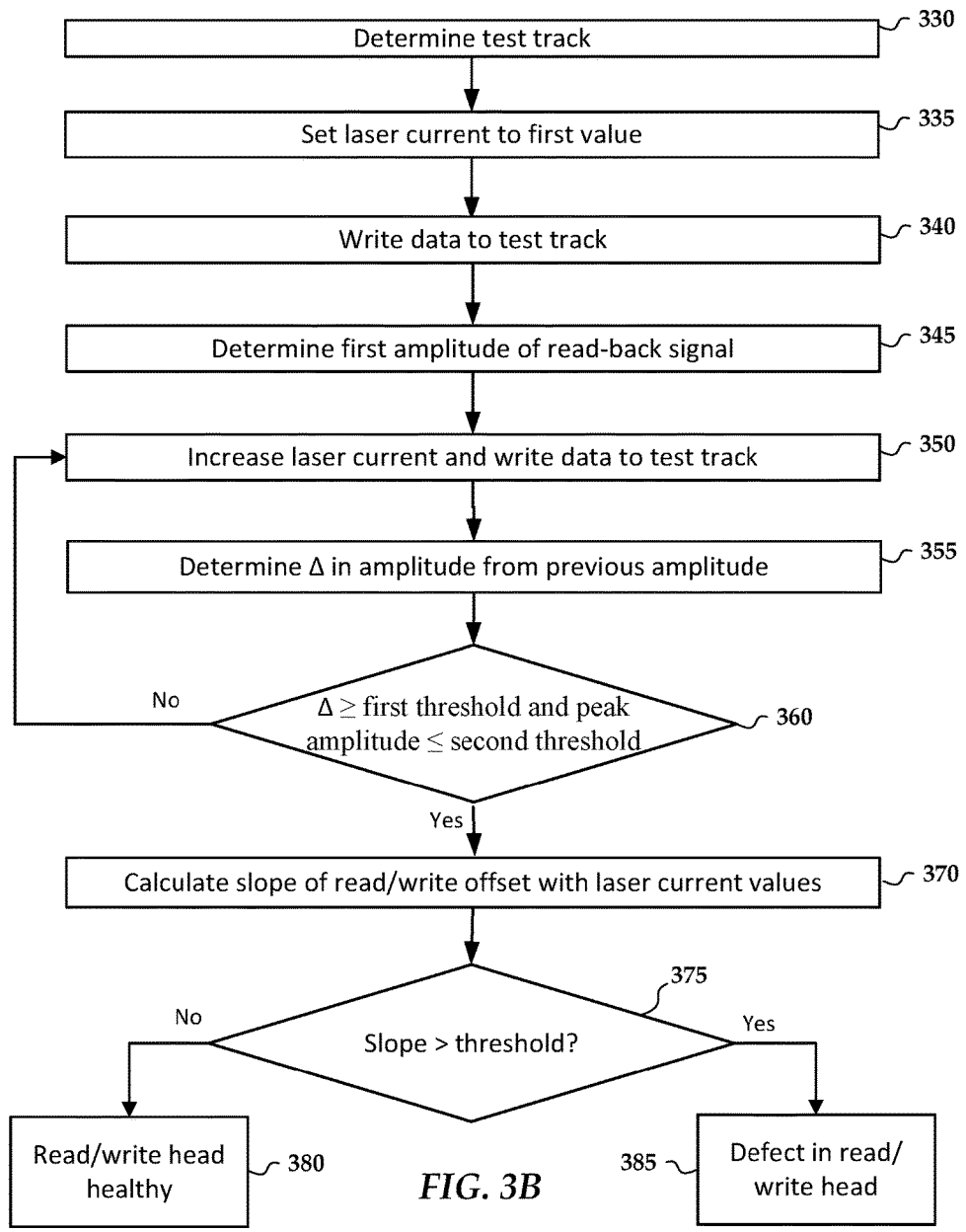

FIG. 3B illustrates another process for monitoring the health of a read/write head in accordance with embodiments described herein. A test track is determined 330. A known good track may be used or the test track may be determined by some other process. A laser current is set 335 to an initial value. Data is written 340 to the test track using the initial laser current value. The data is read from the test track and an initial amplitude of the read-back signal is determined 345. The laser current is increased 350 and data is written to the test track at the increased laser current value. A change in amplitude is determined 355 from a previous amplitude. For example, the current amplitude may be compared with an immediately preceding amplitude value such as the initial amplitude value if this is the first laser current increase. In some cases, the change in amplitude may be determined by comparing the current amplitude to some other previous amplitude and/or to a baseline amplitude value. It is determined 360 whether the change in amplitude is greater than or equal to a first threshold and whether the current amplitude value is less than or equal to a second threshold. If one or both of these conditions are not met, the process continues iteratively increasing the laser current and determining the change in amplitude until both of the conditions are met. In some cases, only one of the conditions have to be met to stop the iterative process. In FIG. 3B, if both of the conditions are met, the slope of the WRO values at the respective maximum amplitudes with the laser current values is calculated 370. If it is determined 375 that the calculated slope is greater than a predetermined threshold, the process determines 385 that there may be a defect in the read/write head. If it is determined 375 that the slope is less than or equal to the threshold, the process determines 380 that the read/write head is healthy. According to various embodiments, the process of FIG. 3B may be repeated for other test tracks. While the process of FIG. 3B describes iteratively increasing the laser current, it is to be understood that the process may iteratively decrease the laser current value and/or may use some other process for determining a subsequent laser current value.

Figure 4:
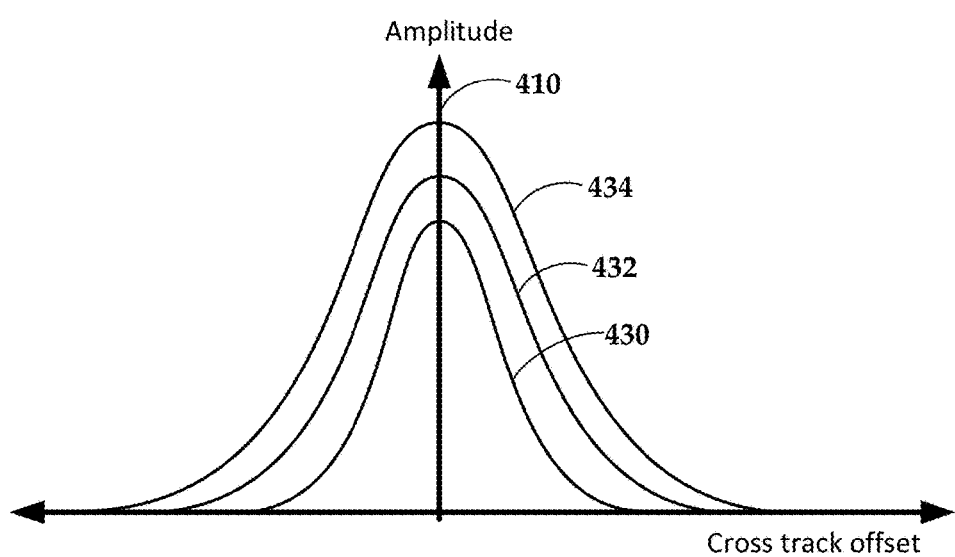
FIG. 4 a illustrates test results that may indicate a normal NFT according to some implementations.

For a healthy NFT, the WRO value at the maximum amplitude may remain substantially constant for different laser current values. FIG. 4 shows test results that may indicate that the NFT is healthy. The test results show the amplitude versus the WRO for three different laser current values 430, 432, 434. The WRO value at the maximum amplitude remains substantially constant for each of the laser current values along the vertical marker 410. It is to be understood that while FIG. 4 illustrates an example in which three different laser current values are used, the health monitoring process may use more or fewer laser current values to determine the health of the NFT.

Figure 5A:
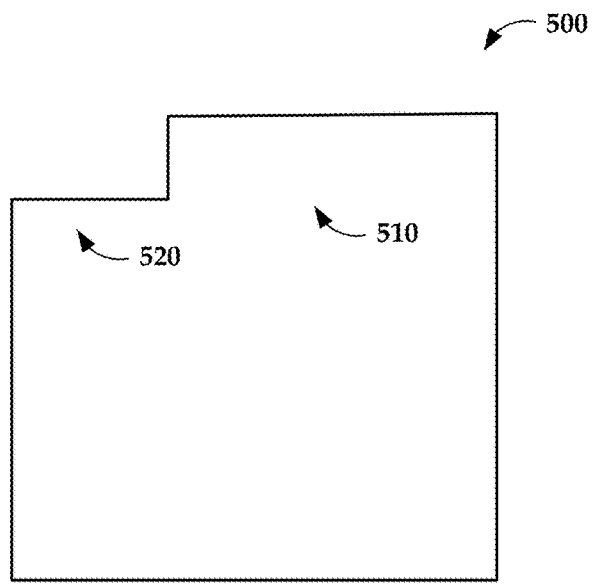
FIG. 5A shows an NFT having a normal activation area and a defective activation area in accordance with various embodiments.

According to various embodiments, any defect or non-uniform shape of the NFT, the NFT may not have uniform activation causing a change in the maximum amplitude WRO values for different laser current levels. For example, FIG. 5A shows an NFT 500 having a normal activation area 510 and a defective activation area 520. The normal activation area 510 may experience more activation than the defective activation area 520.

Figure 5B:
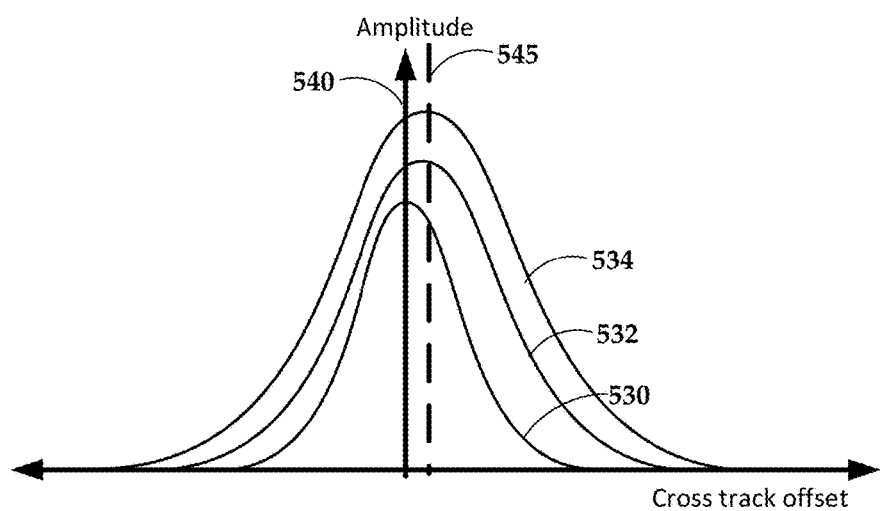
FIGS. 5B-5D illustrates test results that may indicate a changed and/or defective NFT according to some aspects.

In FIG. 5B, a graph illustrates additional test results that may indicate a changed and/or defective NFT. For purposes of this example, the test is performed at the amplitudes 530, 532, 534 that are the same as previously shown amplitudes 430, 432, 434, although different amplitudes may be used. The results of a cross-track scan of the currently written track results in maximum amplitudes, which may be different from the respective amplitudes in FIG. 4B and/or baseline amplitudes. Baseline amplitudes may have been measured from a first-written test track, e.g., during certification testing. FIG. 5B shows a shift in the WRO value for different laser current values. The test result at a first laser current value 530 has a first WRO value 540 at the maximum amplitude. The test results for second 532 and third 534 laser current values have a WRO value 545 at the respective maximum amplitudes that are shifted with respect to the WRO value at the maximum amplitude of the first test result 530. This may indicate that the NFT has a defect causing a difference in activation across the NFT. While this condition may be represented a failure for the purposes of this procedure, a detected RWO value shift may be correctable.

Figure 5C:
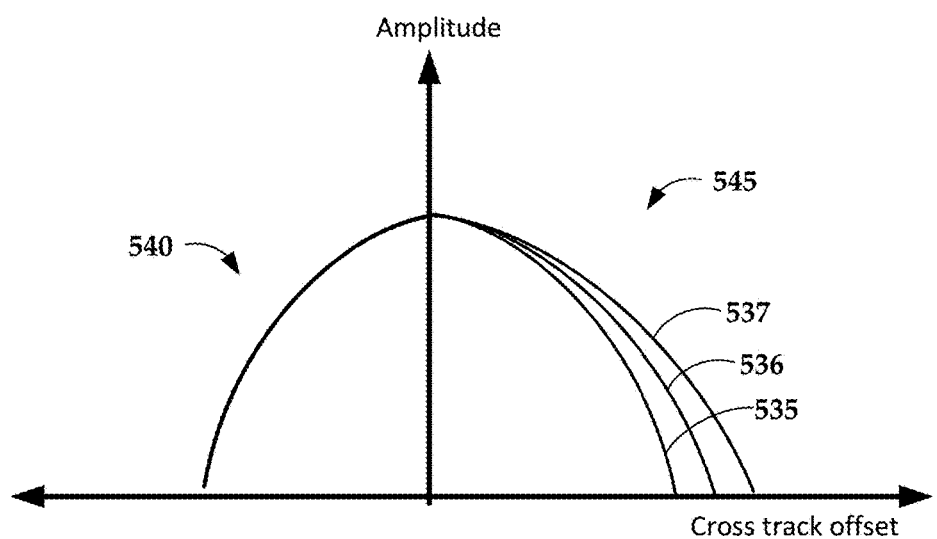

Similarly to FIG. 5B, FIG. 5C test results that may indicate a changed and/or defective NFT. In FIG. 5C, the maximum amplitude value is normalized so that each of the test results 535, 536, 537 at the three different laser currents have substantially the same or similar maximum amplitude. First region 540 of the test results represents areas with less activation of the NFT because the overall amplitudes are lower than in the second region 545. The test results in the second region 545 have a shifted and higher maximum representing a healthier NFT portion.

Figure 5D:
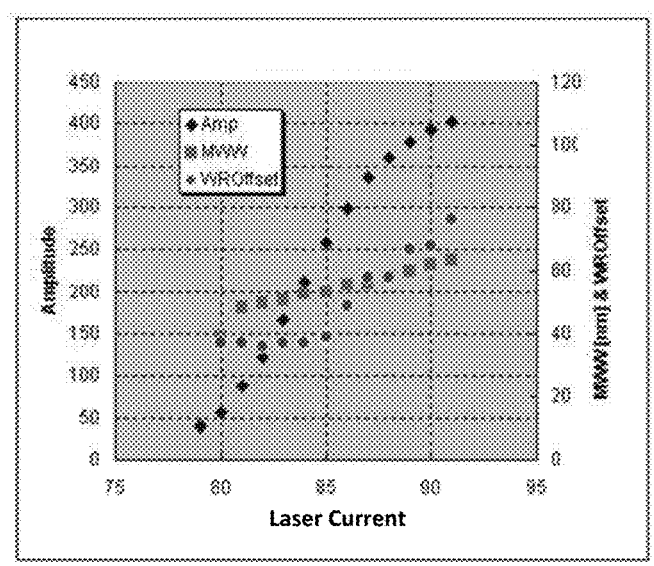

FIG. 5D illustrates more test results that may indicate a changed and/or defective NFT. The maximum amplitude value increases as the laser current increases. The slope for the WRO value at a respective maximum amplitude versus the laser current remains substantially constant between a laser current value between 80 and 85. The slope of the WRO value at the respective maximum amplitude versus the laser current begins to increase around a laser current value around 85 potentially indicating non-uniform activation across the NFT. This increase in slope may indicate that the NFT has a defect. FIG. 51D also shows the Maximum Write Width (MWW) versus the laser current. As can be observed from FIG. 5D, the MWW increases as the laser current increases.

Figure 6:
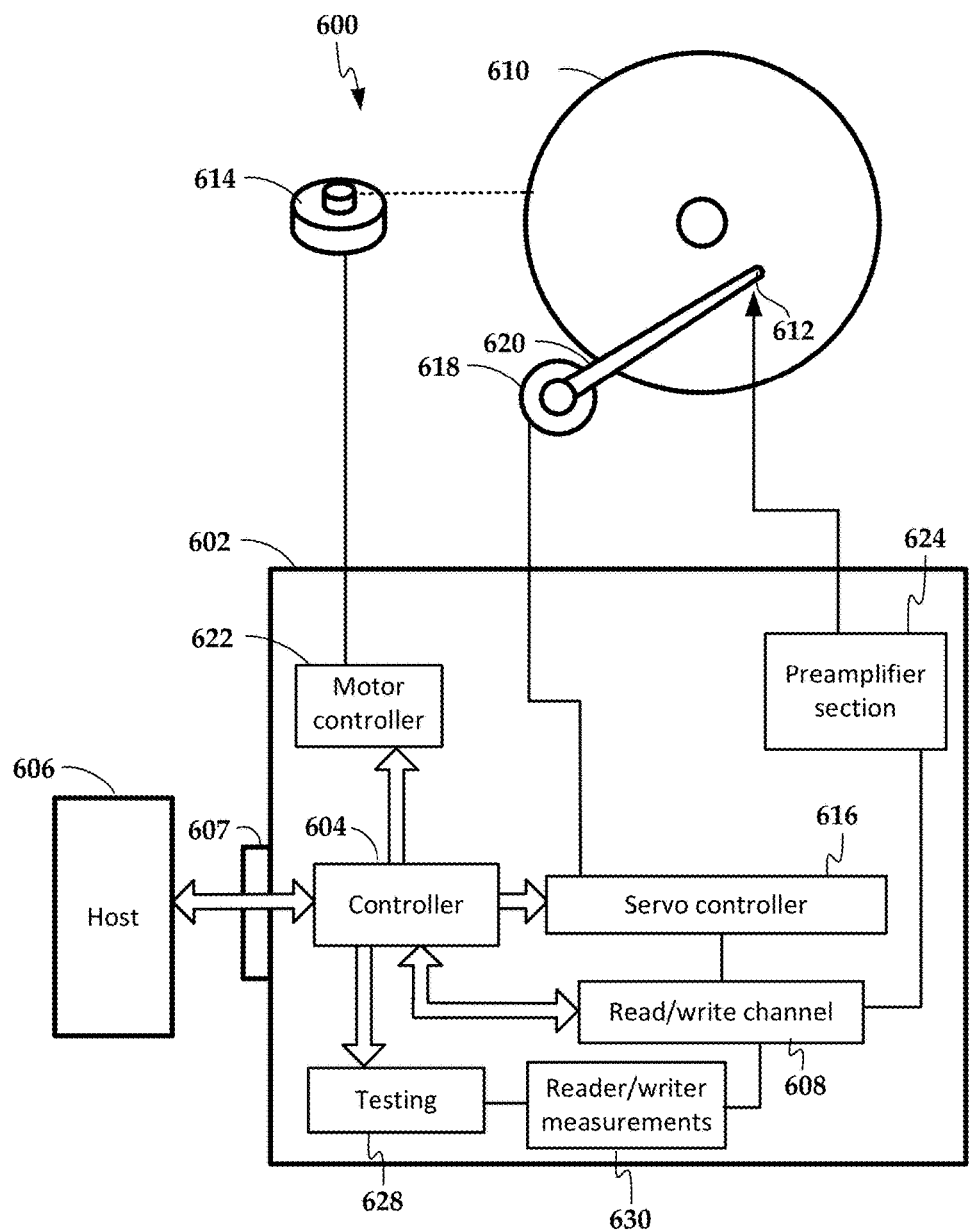
FIG. 6 is a block diagram of an apparatus according various embodiments described herein.

In reference now to FIG. 6, a block diagram illustrates components of system 600 according to an example embodiment. The system 600 may be part of a test stand or include a fully-assembled hard drive. The system 600 includes circuitry 602 coupled to one or more read/write heads 612 that may ultimately be used in a hard drive. The circuitry 602 includes a controller 604 that controls a number of functions of the system 600, optionally including communications between the circuitry 602 and a host device 606 via a host interface 607. The host device 606 may include any electronic device that can be communicatively coupled to communicate with the circuitry 602, e.g., a general-purpose computer, a factory test bench, remote terminal, etc.

The controller 604 may include any combination of custom logic circuits, application specific integrated circuits (ASICs), general-purpose central processing unit (CPU), interface circuits, and may utilize instructions stored as firmware and/or software. The controller 604 may read data from and write data to a recording medium (e.g., disk 610) via a read/write channel 608. The controller 604 may, among other things, determine a location on the disk 610 for the desired data, move the heads to the location (track) of the data, read or write the data via the read/write channel 608, correct errors, transfer the data to/from the host 606, etc.

The read/write channel 608 converts data between the digital signals processed by the data controller 604 and the analog signals conducted through read/write heads 612. The read/write channel 608 also provides servo data read from the disk 610 to a servo controller 616. The servo controller 616 uses these signals to drive an actuator 618 (e.g., voice coil motor) that rotates an arm 620, upon which the read/write heads 612 are mounted. The heads 612 are moved radially across different tracks of the disk(s) 610 by the actuator motor 618 (e.g., voice coil motor), while a spindle motor 614 rotates the disk(s) 610. A microactuator (not shown) may also be included to provide finer tracking control, and also receives inputs from the servo controller 616. The controller 604 controls the spindle motor 614 by way of a motor controller 622.

During write operations, the read/write channel 608 provides analog signals that are delivered to the read/write heads 612 by way of a preamplifier section 624. The preamplifier section 624 amplifies and conditions the write signals sent to write coils of the read/write heads 612. In the illustrated embodiment, the preamplifier section 624 also includes circuitry that energizes a laser (or other energy source) at each of the read/write heads 612 during write operations. The laser preamplifier provides signals that activate the lasers to heat a spot on the disk 610 as it is being recorded.

The preamplifier section 624 may also include circuitry that processes signals generated at the read/write heads 612. For example, the preamplifier section 624 may include a variable gain amplifier (VGA) that receives data signals from one or more of the read/write heads 612 during read operations. The VGA provides a variable amount of gain so that the signal has sufficient amplitude without saturation for use by the read/write channel 608. The amount of gain provided by the VGA is inversely proportional to the amplitude of the track, and can be used to perform the monitoring procedures described above.

A testing module 628 is operable by the controller to perform testing operations, e.g., during a design, manufacturing, and/or operational phase of a hard disk. As indicated by reader/writer measurement module 630, the testing module 628 is used to measure a cross-track signal profile of one or more tracks (e.g., test tracks) written to the disk 610. The cross track profile may be obtained via the VGA, read/write channel 608, or other hardware not shown such as an oscilloscope. This testing may at least be used to determine the maximum amplitudes at the various laser current values and to use this information to calculate the slope of the WRO at the maximum amplitude values versus the laser current values.

In one example of the testing, the servo controller 616 and read/write channel 608 are commanded to record a signal to at least part of a track on the disk(s) 610 using each of the read/write heads 612. These track portions may include a known pattern of data to facilitate more easily decoding the data later on. The servo controller 616 then reads back the parts of the tracks using multiple passes, while offsetting (via the servo controller 616) the respective read/write head 612 different amounts relative to the track centerline for each of the passes. For each of the passes, a measured value of amplitude as a function of servo offset may be recorded by the measurement module 630 to obtain a cross track amplitude profile. The amplitude values may be determined using any combination of the amount of gain used by the VGA to read the data, harmonic sensor output, signal-to-noise ratio of the signal, and bit error rate seen by the read write channel. The harmonic sensor is a narrow-band filter that measures amplitude for specific programmed frequency. The harmonic sensor is provided by the read channel, and may use programmable values of frequency for measuring amplitude.

This measurement and recording of the amplitude profiles may be performed at multiple zones spread across the disk(s) 610. The measured profiles may be analyzed as described above (e.g., slope of WRO values compared to a threshold) and used to qualify the read/write head 612. This qualification may involve grading and/or rejecting a read/write head 612 during factory test, during a head screen method during a component test and/or may also be used in fielded hard drive assemblies, e.g., to diagnose performance issues, perform mediation, etc. Data recorded from the measurements may be stored in persistent storage, e.g., on the disk 610 or flash memory (not shown) and be used as baseline values as described above.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
moving a heat-assisted magnetic recording head relative to a magnetic recording medium comprising a plurality of tracks, the head comprising a reader and a writer including a near-field transducer (NFT) optically coupled to a laser diode, the writer comprising a center which is laterally offset relative to a center of the reader to define a writer-reader offset (WRO) therebetween;
writing patterns to a particular track at a plurality of laser diode current levels;
reading the patterns and calculating an WRO value for each of the laser diode current levels;
calculating a slope of the WRO values with the laser diode current levels; and
determining a health condition of the NFT based on the slope.

2. The method of claim 1, further comprising, determining that there is a defect in the NFT if the slope is greater than the predetermined threshold.

3. The method of claim 1, wherein calculating the WRO value for each of the laser diode current levels comprises calculating the WRO value at a peak amplitude position for each of the laser diode current levels.

4. The method of claim 3, wherein determining the health condition of the NFT comprises determining an offset of the peak amplitude position compared to a baseline maximum amplitude position.

5. The method of claim 3, wherein determining the health condition of the NFT comprises determining an offset of the peak amplitude position compared to a previously measured peak amplitude position of the test track.

6. The method of claim 1, wherein writing patterns to the particular track at the plurality of laser diode current levels comprises:
writing patterns to the particular track at a first laser diode current level; and writing patterns to the particular track at iteratively increasing laser diode current levels until a stop condition is reached.

7. The method of claim 6, further comprising,
determining a maximum amplitude for each of the laser current diode levels;
determining a change in the maximum amplitude from a previously determined maximum amplitude at a different laser diode current level; and
using the change in the maximum amplitude to determine the stop condition.

8. The method of claim 7, further comprising, determining that the stop condition has been reached if the change in the maximum amplitude from the previously determined maximum amplitude is greater or equal to a first threshold and a current maximum amplitude is less than or equal to a second threshold.

9. The method of claim 8, wherein the previously determined maximum amplitude is an immediately preceding maximum amplitude.

10. The method of claim 1, wherein determining the health condition of the NFT based on the slope comprises determining if the slope is greater than a predetermined threshold indicative of non-uniform activation across the NFT.

11. A method, comprising:
moving a heat-assisted magnetic recording head relative to a magnetic recording medium comprising a plurality of tracks, the head comprising a reader and a writer including a near-field transducer (NFT) optically coupled to a laser diode, the writer comprising a center which is laterally offset relative to a center of the reader to define a writer-reader offset (WRO) therebetween;
writing patterns to a particular track at a plurality of laser diode current levels;
reading the patterns and calculating an WRO value for each of the laser diode current levels; and
determining a health condition of the NFT based on a difference of WRO values between at least two laser current values.

12. The method of claim 11, further comprising, determining that there is a defect in the NFT if the difference is greater than the threshold.

13. The method of claim 11, wherein writing patterns to the particular track at the plurality of laser diode current levels comprises:
writing patterns to the particular track at a first laser diode current level; and
writing patterns to the particular track at iteratively increasing laser diode current levels until a stop condition is reached.

14. The method of claim 13, further comprising,
determining a maximum amplitude for each of the laser current diode levels;
determining a change in the maximum amplitude from a previously determined maximum amplitude at a different laser diode current level; and
using the change in the maximum amplitude to determine the stop condition.

15. The method of claim 14, further comprising, determining that the stop condition has been reached if the change in the maximum amplitude from the previously determined maximum amplitude is greater or equal to a first threshold and a current maximum amplitude is less than or equal to a second threshold.

16. The method of claim 11, wherein calculating the WRO value for each of the laser diode current levels comprises calculating the WRO value at a peak amplitude position for each of the laser diode current levels.

17. An apparatus, comprising:
a preamplifier section configured to communicate with a read transducer and write transducer of a heat-assisted magnetic recording head that reads from and writes to a recording medium comprising a plurality of tracks, the heat-assisted magnetic recording head comprising a near-field transducer (NFT) optically coupled to a laser diode; and
a controller coupled to the preamplifier section and configured to:
move the heat-assisted magnetic recording head relative to the magnetic recording medium, the head comprising a reader and a writer, the writer comprising a center which is laterally offset relative to a center of the reader to define a writer-reader offset (WRO) therebetween;
write patterns to a particular track at a plurality of laser diode current levels;
read the patterns and calculate a WRO value for each of the laser diode current levels;
calculate a slope of the WRO values with the laser diode current levels; and
determine a health condition of the NFT based on the slope.

18. The apparatus of claim 17, wherein the controller is further configured to read the patterns and calculate a WRO value at a peak amplitude position for each of the laser diode current levels.

19. The apparatus of claim 18, wherein the controller is configured to determine the health condition of the NFT by determining an offset of the peak amplitude position compared to an previously measured peak amplitude position of the test track.

20. The apparatus of claim 17, wherein the controller is further configured to determine the health condition of the NFT by determining if the slope is greater than a predetermined threshold indicative of non-uniform activation across the NFT.

* * * * *